United States Patent
Kanodia et al.

(10) Patent No.: US 6,822,195 B2
(45) Date of Patent: Nov. 23, 2004

(54) AUTOMATED WELD LOCATION SYSTEM FOR VEHICLES

(75) Inventors: Vinod L. Kanodia, Rochester Hills, MI (US); Michael L. Dambach, Ferndale, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/405,987

(22) Filed: Apr. 2, 2003

(65) Prior Publication Data

US 2004/0195224 A1 Oct. 7, 2004

(51) Int. Cl.[7] .......................... B23K 9/12; B23K 11/11
(52) U.S. Cl. .................................. 219/124.22; 219/87
(58) Field of Search ................ 219/124.22, 124.34, 219/125.1, 87, 130.01; 901/42; 700/97

(56) References Cited

U.S. PATENT DOCUMENTS

| | | | | |
|---|---|---|---|---|
| 5,327,057 A | * | 7/1994 | Kishi et al. ............ | 318/568.11 |
| 6,327,518 B1 | * | 12/2001 | Kaneko et al. ............. | 700/245 |
| 2003/0010764 A1 | * | 1/2003 | Handa et al. ........... | 219/137 R |
| 2003/0149500 A1 | * | 8/2003 | Faruque et al. ............... | 700/97 |

* cited by examiner

Primary Examiner—Clifford C. Shaw
(74) Attorney, Agent, or Firm—Christopher DeVries

(57) ABSTRACT

An automatically weld locating system locates welds on a subassembly including first and second components. First and second finite element analysis models of the first and second components are retrieved. Edges of the first component are located. An outline of the first component is translated in a direction that is normal to its edge in its plane within a predetermined edge distance. A line segment of the first component is retrieved. Welds are created on the line segment with a predetermined maximum spacing and with a predetermined weld tolerance. The retrieving, determining and creating steps are repeated for additional line segments of the first component. The line segments of the second component are also processed. Welds that are within a predetermined minimum spacing are deleted.

19 Claims, 3 Drawing Sheets

AUTOMATED WELD LOCATION SYSTEM FOR VEHICLES

FIELD OF THE INVENTION

The present invention relates to vehicles, and more particularly to automated systems for identifying welds for a vehicle assemblies.

BACKGROUND OF THE INVENTION

The process of designing a vehicle includes a prototyping stage during which prototype vehicles, vehicle subassemblies, and/or components are built and tested. The vehicle subassemblies may include two or more components that need to be welded together. For example, a vehicle body subassembly typically includes two or more structural components that are welded together. Typically welding methods include spotwelds, Tungsten Inert Gas (TIG) welds, and/or Metal Inert Gas (MIG) welds.

The location of the welds must be identified before the prototype vehicle subassembly can be built. Existing methods for locating the welds include a manual process for determining where the welds should be positioned. If changes are made after testing the prototype, the welds need to be manually relocated for the production assembly. The location of the welds for each subassembly of the vehicle can take from several man-days to several man-weeks to complete. Locating welds for the entire vehicle may take several months or longer. The time that is required to locate the welds has slowed the vehicle development process, which increases the development cost of vehicles.

SUMMARY OF THE INVENTION

A method and apparatus according to the present invention automatically locates welds on a subassembly including first and second components that are to be welded together. First and second finite element (FEA) analysis models of the first and second components of the subassembly are created and include elements. Edges of the first and second components are located. An outline of each component is translated a predetermined edge distance in a direction normal to its edge and in the plane of a corresponding element to define a weld line segment of the first component. Welds are located on the line segment with a predetermined maximum spacing and with a predetermined weld tolerance.

In other features, the identified line segment is compared to a predetermined minimum feature threshold after the identifying step and before the locating step. The identifying, comparing and locating steps are repeated for additional line segments of the first component. The identifying, comparing, locating and repeating steps are repeated for other line segments of the second component.

In still other features, welds that are within a predetermined minimum spacing are deleted on the line segments. Input specifications are retrieved from at least one of a user and memory. The input specifications include at least one of the predetermined edge distance, the weld maximum spacing, the weld minimum spacing, the weld tolerance and the predetermined minimum feature threshold. The welds include at least one of spotwelds, metal inert gas (MIG) welds and Tungsten inert gas (TIG) welds.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
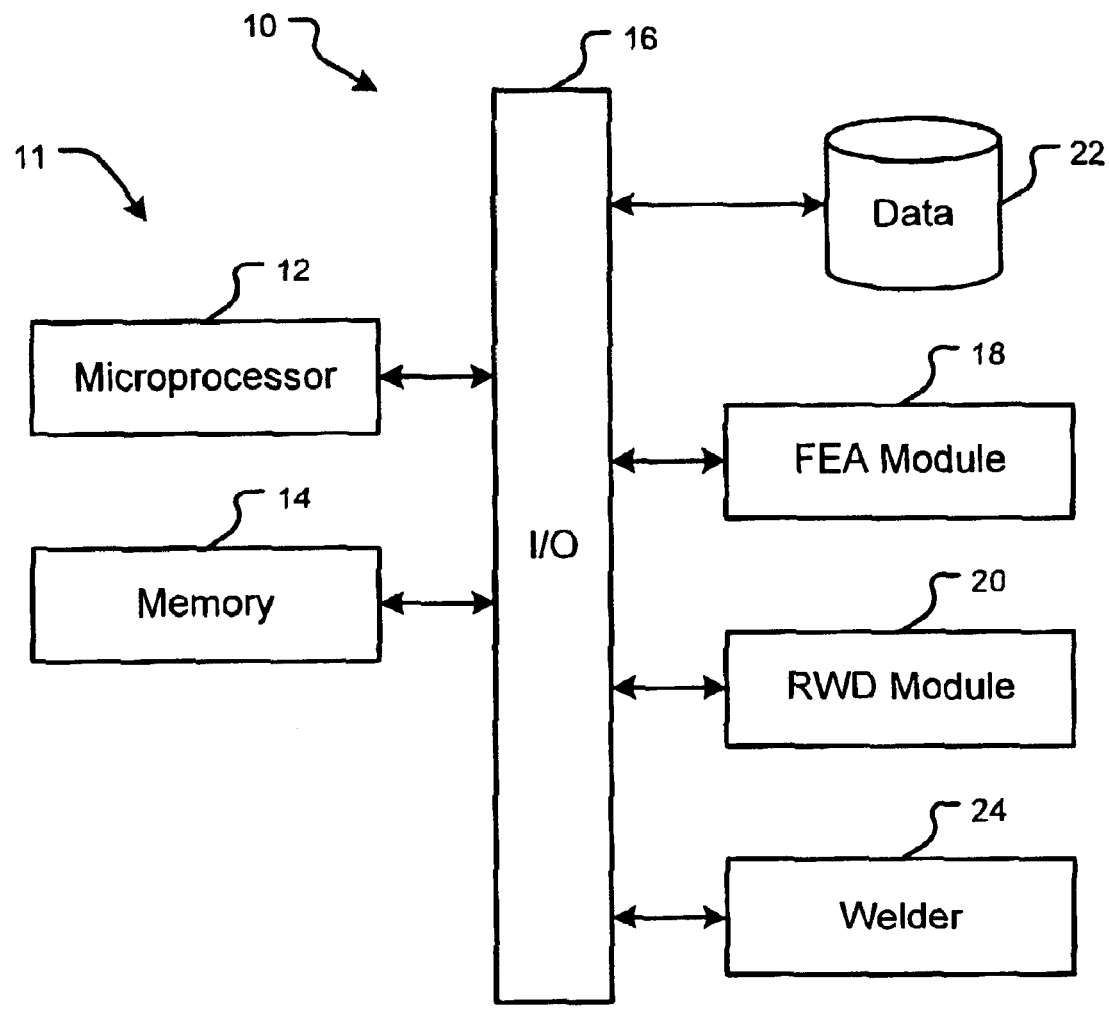
FIG. 1 is a functional block diagram of an automated weld locating system for a vehicle.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, an automated weld locating system 10 is shown. A computer 11 includes a processor 12 and memory 14 such as read only memory (ROM), random access memory (RAM), flash memory, or any other type of internal and/or external electronic data storage. The computer 10 executes a finite element analysis (FEA) module 18, which is a software program that performs FEA. The FEA module 18 allows components of the vehicle and vehicle subassemblies to be created, modified and stored. The FEA components include a plurality of elements, such as edge elements and other elements.

The computer 10 executes a rapid weld definition (RWD) module 20 according to the present invention, which is a software program that interfaces with the FEA module 18 and rapidly locates welds on components of a vehicle subassembly as will be described further below. A data store 22 stores user defined data such FEA models of the components, subassemblies weld locations, and/or vehicle. The weld locations can be used in an automated manufacturing environment. For example, the weld locations can be used to program an automated welder 24.

In a preferred embodiment, the welds are spotwelds, TIG welds, MIG welds, and/or any other type of welds. One suitable FEA module 18 is Altair® Hyperworks® Hypermesh®, although other FEA modules 18 may be employed. In addition, the FEA module 18 according to the present invention preferably employs grid independent welding to allow the placement of welds on the components independent of mesh grid locations.

Grid independent welding allows spot welds to be simulated independent of grid locations. Until recently, spot welds needed to be aligned with grids and was called the point to point method. Due to the aligned grid requirement, the mesh of connected parts were dependent on each other. This approach was a slow and tedious process. Currently several grid independent spot weld simulation methods exist including Rapid Spotweld Modeling (rSM), CWELD in NASTRAN, and CDH method by Chargin et al. The rSM approach uses standard NASTRAN features to simulate a spot weld or any other connection such as MIG welds, TIG welds, rivets, bolts, etc. For example, an rSM connection may include 1 CBUSH +0 to 12 MPC equations, depending upon how many grids are connected to the simulation of the spot weld.

Figure 2:
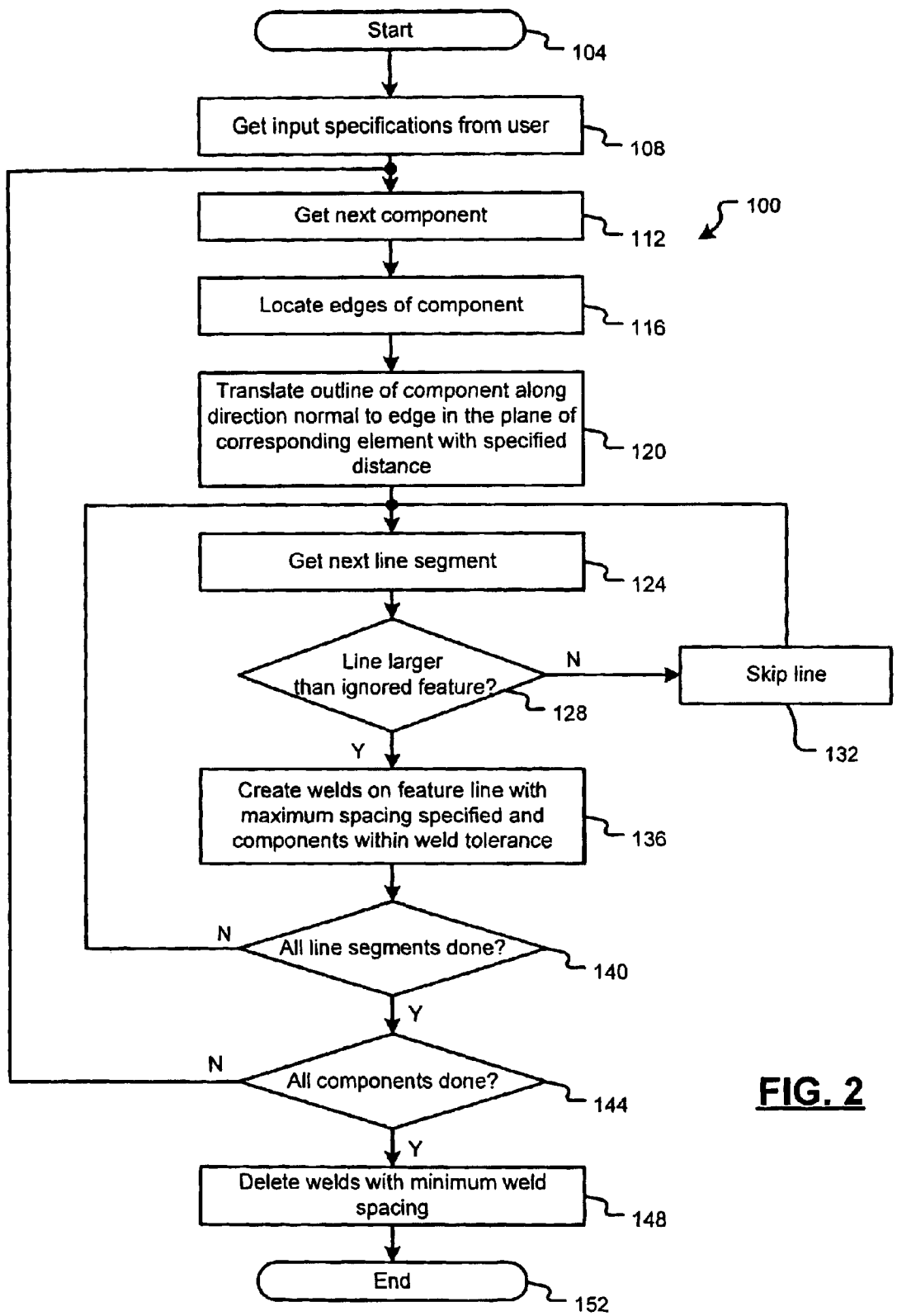
FIG. 2 is a flowchart illustrating steps for rapidly locating welds in the automated weld locating system of FIG. 1.

Referring now to FIG. 2, steps that are performed by the RWD module 20 are shown generally at 100. In step 104, control begins. In step 108, the user inputs specifications are retrieved, as will be described below in conjunction with FIG. 3. The specifications can be input using an input/output device such as a keyboard or mouse, retrieved from memory 14, retrieved from the data store 22 and/or default settings can be used. In step 112, a next component of a vehicle assembly is retrieved. If this is the first component, the first component is retrieved. In step 116, edges of the component are located. In step 120, control translates an outline of the component along a direction that is normal to an edge in a plane of a corresponding part or component within a specified distance.

In this step, an outline of the part is obtained. The outline is simply a trace of free edges or edge elements of the component. The free edge is a closed loop for a stamped sheet metal part. Note that there can be multiple free edges if the part has holes or cutouts. Then, the free edges are translated in a direction that is normal to the free edge at every point and along the surface of the part at a distance that is equal to the edge distance.

In step 124, a next line segment for the component is identified. In step 128, control determines whether the line segment is larger than an ignored feature threshold. If not, the line segment is skipped in step 132. Otherwise, control creates welds on the line segment with a maximum spacing that is specified by the user input specifications and parts with weld tolerances.

In step 140, control determines whether all line segments of the component are done. If not, control loops back to step 124. Otherwise, control determines whether all of the components in the subassembly are done in step 144. If not, control loops back to step 112. Otherwise, control continues with step 148 and welds that are within a minimum spacing are deleted. Control ends in step 152.

Figure 3:
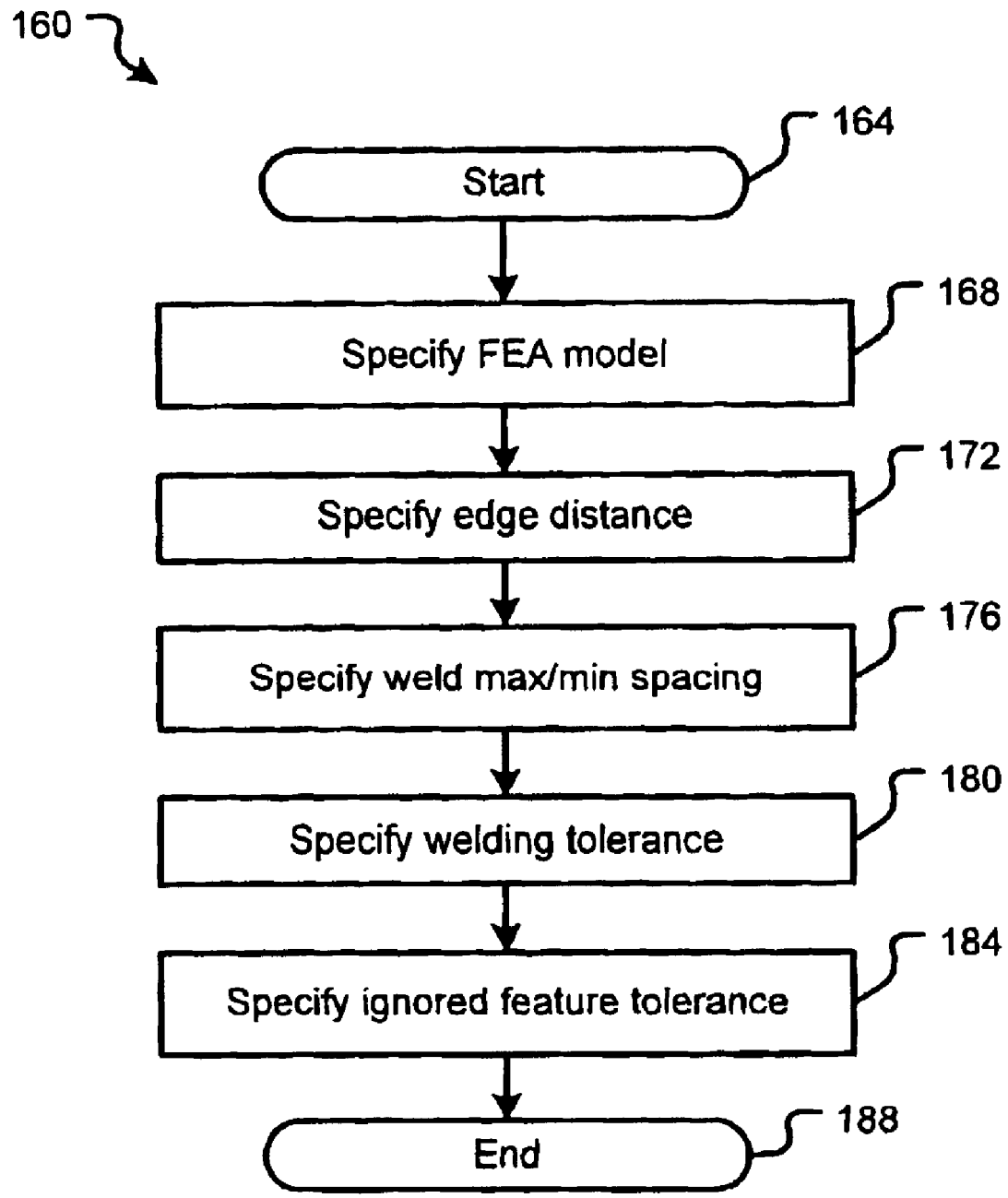
FIG. 3 is a flowchart illustrating steps for entry of exemplary user specifications.

Referring now to FIG. 3, steps for generating user input specifications are shown generally at 160. In step 164, the user specifies the FEA model. In step 172, the user specifies a weld edge distance. A spot weld has a minimum distance to the free edge of a part. If it is closer to the edge than the weld edge distance, the weld is generally a bad weld having reduced strength. To prevent welds having reduced strength, the welds that are defined by the present invention satisfy the weld edge distance requirement.

In step 176, the user specifies a maximum and minimum weld spacing. In step 180, the user specifies a welding tolerance, which is a normal distance between components that are to be welded. In step 184, the user specifies ignored feature tolerances, which is the minimum length of a line segment to be welded.

Once the FEA model for the subassembly is selected and the input parameters are entered, the RSD module 20 assumes that all of the components are welded along their line segments or edges if the following requirements are met. First, two or more components mate or overlap in regions that are intended to be welded. Second, the components are located close enough to be within the weld tolerance that is specified by the user. Third, the edge or line segment of at least one of the components is located in the regions that are to be welded.

The automated weld locating system according to the present invention automates the locations of welds. The automated weld locating system requires the user to input the FEA model for the subassembly and the input specifications set forth above. Once these values are input, the automated weld locating system generates weld locations in the FEA model, which can be used for subsequent rapid prototyping. The FEA module with weld locations also may be used to program an automated welding fixture. The FEA module 18 may also further optimize the locations of the welds to improve the strength of the subassembly. By increasing the speed that the welds can be located, the automated weld locating system significantly increases the speed of the vehicle development process. Assembly sequence and manufacturing specifications can be built into this process so that the welds defined by the RWD module are fully defined in terms of weld station identification, 2t, 3t, 4t (where t is the number of parts) or 1 to 2 previous condition (for sub-subassemblies).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for automatically locating welds on a subassembly including first and second components, comprising:

creating first and second finite element analysis models of the first and second components of the subassembly;

locating edges of the first and second components;

defining a weld line segment of the first component; and locating welds on the line segment with a predetermined maximum spacing and with a predetermined weld tolerance.

2. The method of claim 1 further comprising determining whether the weld line segment is greater than a predetermined minimum feature threshold after said defining step and before said locating step.

3. The method of claim 2 further comprising repeating said defining, determining, and locating steps for additional line segments of the first component.

4. The method of claim 3 further comprising repeating said defining, determining, locating and repeating steps for line segments of said second component.

5. The method of claim 4 further comprising deleting welds that are within a predetermined minimum spacing.

6. The method of claim 5 further comprising retrieving input specifications from at least one of a user and memory, wherein said input specifications include at least one of said predetermined edge distance, said weld maximum spacing, said weld minimum spacing, said weld tolerance and said predetermined minimum feature threshold.

7. The method of claim 1 wherein said welds include at least one of spotwelds, metal inert gas (MIG) welds and Tungsten inert gas (TIG) welds.

8. The method of claim 1 wherein said defining step includes translating an outline of the first component a predetermined edge distance in a direction that is normal to an edge of the first component and in the plane of a corresponding edge element to define said weld line segment of the first component.

9. A method for automatically locating welds on a subassembly including first and second components, comprising:

retrieving first and second finite element analysis models of the first and second components of the subassembly;

locating edges of the first and second components;

translating an outline of the first component a predetermined edge distance in a direction that is normal to an edge of the first component and in the plane of a corresponding edge element to define a weld line segment of the first component;

determining whether the line segment is greater than a predetermined minimum feature threshold; and locating welds on the line segment with a predetermined maximum spacing and with a predetermined weld tolerance, wherein said welds include at least one of spotwelds, metal inert gas (MIG) welds and Tungsten inert gas (TIG) welds.

10. The method of claim 9 further comprising repeating said identifying, determining and locating steps for additional line segments of the first component.

11. The method of claim 10 further comprising repeating said identifying, determining, locating and repeating steps for line segments of said second component.

12. The method of claim 11 further comprising deleting welds that are within a predetermined minimum spacing.

13. The method of claim 12 further comprising requesting input specification from at least one of a user and memory, wherein said input specification include at least one of said predetermined edge distance, said weld maximum spacing, said weld minimum spacing, said weld tolerance and said predetermined minimum feature threshold.

14. An automatic weld locating system that locates welds on a subassembly including first and second components, comprising:

a computer including a processor and memory;

a finite element analysis (FEA) module that is executed by said computer and that creates first and second finite element analysis models of the first and second components of the subassembly; and a rapid weld defining (RWD) module that communicates with the FEA module and that locates edges of the first component, defines a weld line segment of the first component, and locates welds on said line segment with a predetermined maximum spacing and with a predetermined weld tolerance.

15. The automatic weld locating system of claim 14 wherein said RWD module determines whether said line segment is greater than a predetermined minimum feature threshold.

16. The automatic weld locating system of claim 15 wherein said RWD module processes additional line segments of the first component.

17. The automatic weld locating system of claim 16 wherein said RWD module processes line segments of said second component.

18. The automatic weld locating system of claim 17 wherein said RWD module deletes welds on said line segments of said first and second components that are within a predetermined minimum spacing.

19. The automatic weld locating system of claim 14 wherein said RWD module translates an outline of the first component a predetermined edge distance in a direction that is normal to an edge of the first component and in the plane of a corresponding edge element to define said weld line segment of the first component.

* * * * *